United States Patent
Lin

(10) Patent No.: US 7,713,082 B2
(45) Date of Patent: May 11, 2010

(54) MULTI-FUNCTIONAL SHACKLE STRUCTURE

(76) Inventor: Hsiao-Chi Lin, 7F., No. 423, Mingshuei Rd., Jhongshan District, Taipei City 104 (TW)

( * ) Notice: Subject to any disclaimer, the term of this patent is extended or adjusted under 35 U.S.C. 154(b) by 694 days.

(21) Appl. No.: 11/655,286

(22) Filed: Jan. 19, 2007

(65) Prior Publication Data

US 2008/0120817 A1     May 29, 2008

(30) Foreign Application Priority Data

Nov. 29, 2006    (TW) .............................. 95221011 U

(51) Int. Cl.
*H01R 3/00*     (2006.01)
(52) U.S. Cl. ...................................... 439/490
(58) Field of Classification Search ................ 439/490, 439/483, 484, 37, 577
See application file for complete search history.

(56) References Cited

U.S. PATENT DOCUMENTS

| | | | | |
|---|---|---|---|---|
| 4,600,810 A | * | 7/1986 | Feldman et al. ............... | 379/21 |
| D291,071 S | * | 7/1987 | Breil ........................... | D10/78 |
| 4,920,555 A | * | 4/1990 | Ingalsbe ....................... | 379/21 |
| 6,705,901 B1 | * | 3/2004 | Lin .............................. | 439/668 |
| 6,908,333 B2 | * | 6/2005 | Larson ......................... | 439/490 |
| 6,921,284 B2 | * | 7/2005 | Sirichai et al. ............... | 439/490 |
| 6,969,273 B2 | * | 11/2005 | Chen ........................... | 439/490 |
| 6,979,223 B2 | * | 12/2005 | Chen ........................... | 439/490 |
| 7,347,638 B1 | * | 3/2008 | Lin .............................. | 401/195 |
| 7,427,216 B1 | * | 9/2008 | Wu et al. ..................... | 439/638 |
| 2004/0029435 A1 | * | 2/2004 | Larson ......................... | 439/490 |
| 2005/0101180 A1 | * | 5/2005 | Sirichai et al. ............... | 439/490 |
| 2005/0124209 A1 | * | 6/2005 | Currie et al. ................. | 439/490 |

* cited by examiner

*Primary Examiner*—T C Patel
*Assistant Examiner*—Vladimir Imas
(74) *Attorney, Agent, or Firm*—Muncy, Geissler, Olds & Lowe, PLLC

(57) ABSTRACT

A multi-functional shackle structure is composed of a tube. Two ends of the tube are transfixed respectively with a USB (Universal Serial Bus) flash disk and an LED (Light Emitting Diode) illuminating assembly. An end of the USB flash disk is a circuit board which is emplaced in the tube, and the other end is a USB connector which is protruded out of the tube for connecting with a computer to download data. A circuit board lamp holder of the LED illuminating assembly is provided with an LED which is assembled above a battery assembly and a spring, such that when the circuit board lamp holder is displaced downward, the LED can be mutually conducted with the battery assembly to energize and illuminate.

6 Claims, 6 Drawing Sheets

MULTI-FUNCTIONAL SHACKLE STRUCTURE

BACKGROUND OF THE INVENTION (a) Field of the Invention

The present invention relates to a multi-functional shackle structure, and more particularly to a shackle, wherein two ends of a tube of the shackle are formed respectively with a holding space for emplacing a USB (Universal Serial Bus) flash disk and an LED (Light Emitting Diode) illuminating assembly, such that the shackle can be provided with both a function of storing digital data and a function of illuminating.

(b) Description of the Prior Art

Referring to FIG. 1, a conventional shackle 10 is provided with an elliptical tube 11, an interior of which is formed with an opening. An end of the opening of the tube 11 is pivoted with a locking member 13 which can be pivotally locked on the other end of the tube 11 to close the opening. Therefore, by locking with the locking member 13, the shackle 10 can be widely applied to a daily life, such as a shackle used in rock climbing, or in a key chain.

However, the aforementioned conventional shackle is only applied in linking with an object, and is therefore only provided with a single function without having other purposes. Accordingly, the shackle is not provided with the sufficient function and is not in compliance with requirement of multi-functions.

SUMMARY OF THE INVENTION

The primary object of present invention is to provide a multi-functional shackle structure, which is provided with both a function of storing digital data and a function of illuminating.

Accordingly, two end surfaces of a tube of the shackle body of present invention are concaved respectively with a holding space for emplacing a USB (Universal Serial Bus) flash disk and an LED (Light Emitting Diode) illuminating assembly. An end of the USB flash disk is a circuit board, the other end is a USB connector which is electrically connected with the circuit board, and a center is provided with a round plug, such that when the disk is installed in one holding space of the tube, it can be locked at an inner wall of the tube by the round plug, which enables the circuit board to be emplaced in the holding space, and enables the USB connector to be protruded out of the tube. On the other hand, the LED illuminating assembly is provided with a spring, a battery assembly, and a circuit board lamp holder. The spring is assembled at the lowest part of the other holding space, and the battery assembly is transfixed in that holding space, above the spring. The circuit board lamp holder is electrically connected with an LED which is assembled above the battery assembly, such that a conduction part, the battery assembly, and the spring are pressed and joined together. When the circuit board lamp holder is displaced downward at the tube opening, the other conduction part of the circuit board lamp holder can be in contact with the tube opening, which enables the LED to be mutually conducted with the battery assembly to energize and illuminate. Accordingly, through a combination of the USB flash disk and the LED illuminating assembly, the shackle can be provided with both the function of storing digital data and the function of illuminating.

Another object of the present invention is to provide a multi-functional shackle structure, such that the shackle is provided with both the function of storing digital data and a function of whistling for help.

Accordingly, an end surface of a tube of the shackle body of present invention is concaved with a holding space for emplacing a USB flash disk; whereas the other end surface is provided with a whistle. An end of the USB flash disk is a circuit board, the other end is a USB connector which is electrically connected with the circuit board, and a center is provided with a round plug, such that when the disk is installed in the holding space of the tube, it can be locked at an inner wall of the tube by the round plug, which enables the circuit board to be emplaced in the holding space, and enables the USB connector to be protruded out of the tube. On the other hand, an end of the whistle is connected with the tube, and the other end is provided with an air inlet. In addition, the whistle is provided with a whistle-sound opening, such that when air is blown into the air inlet, air flow can create the whistle sound on that whistle-sound opening. Accordingly, through a combination of the USB flash disk and the whistle, the shackle can be provided with both the function of storing digital data and the function of whistling for help.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
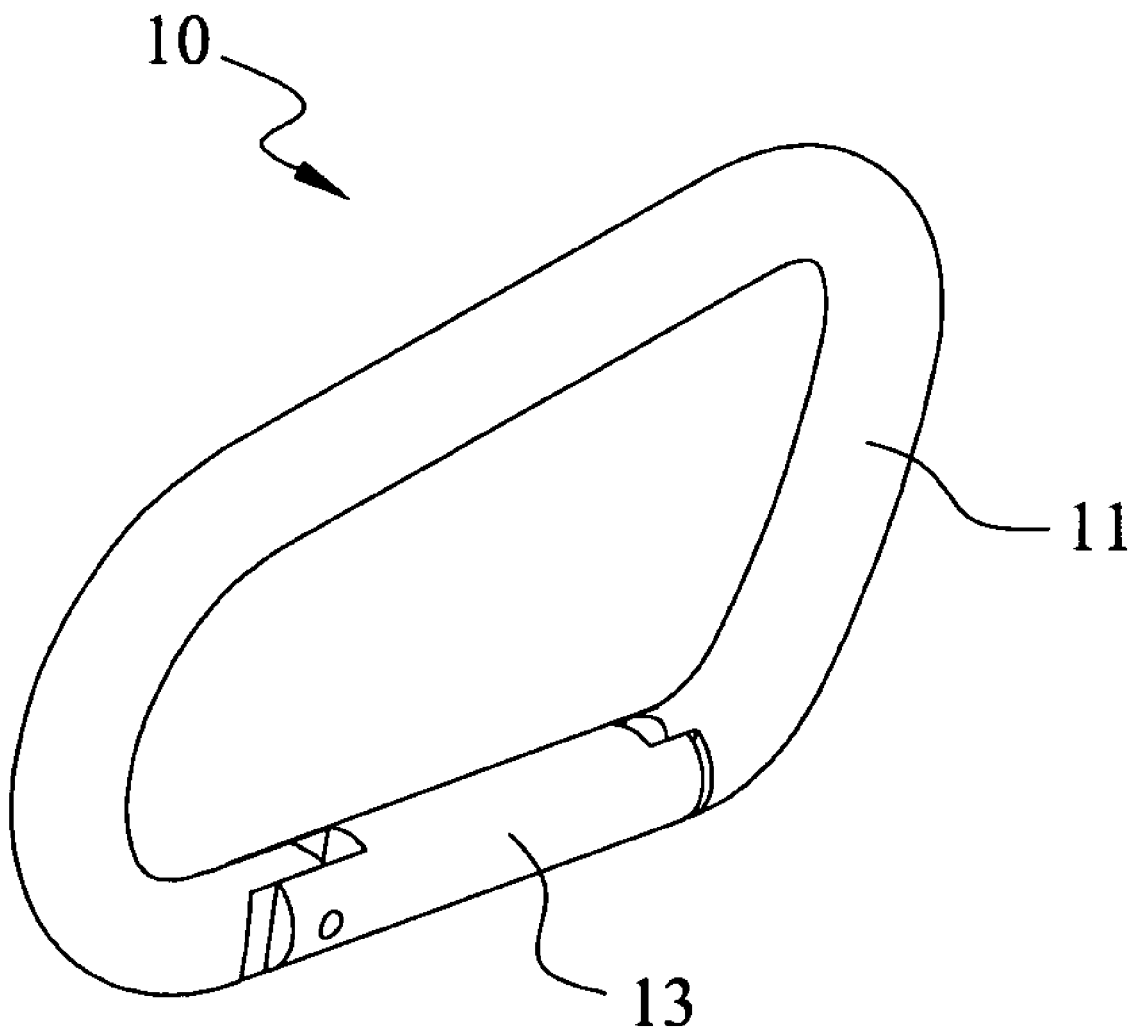
FIG. 1 shows a perspective view of a conventional shackle.
Figure 2:
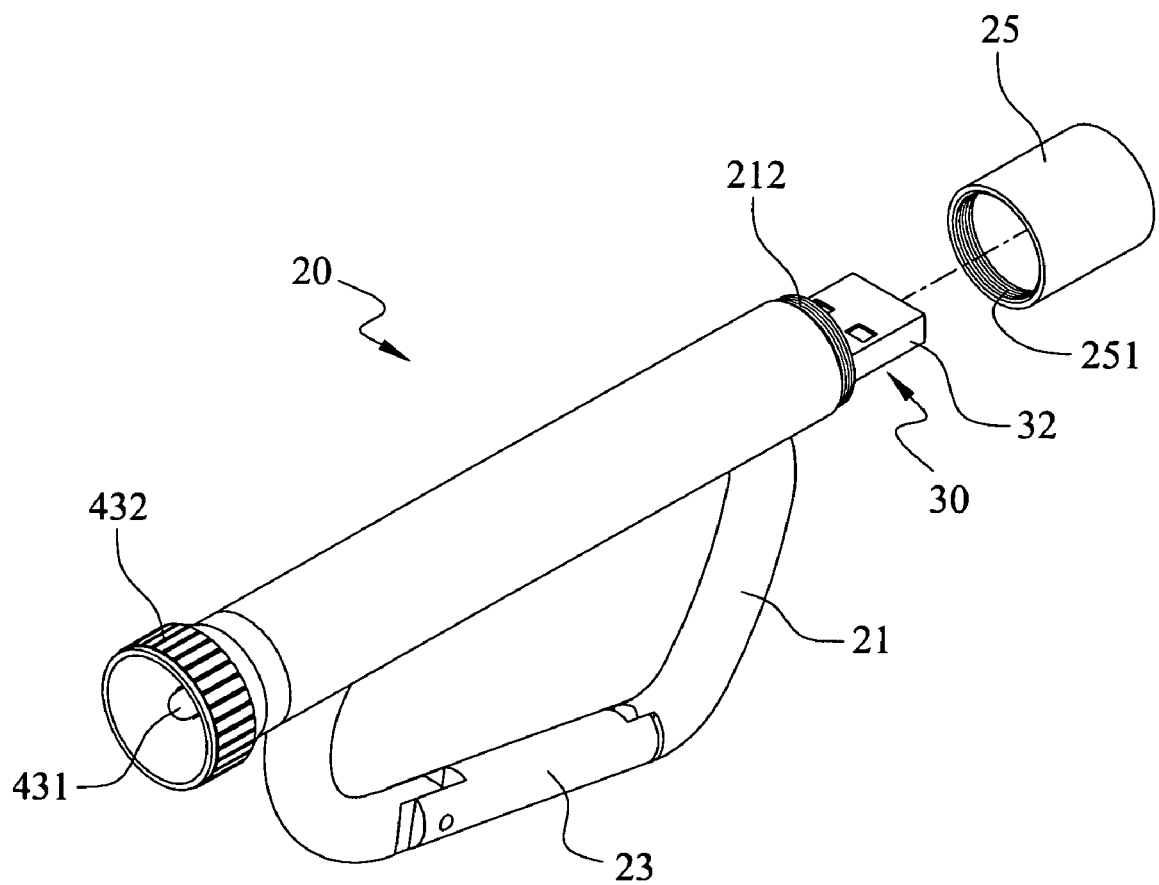
FIG. 2 shows a perspective view of a shackle of the present invention.
Figure 3:
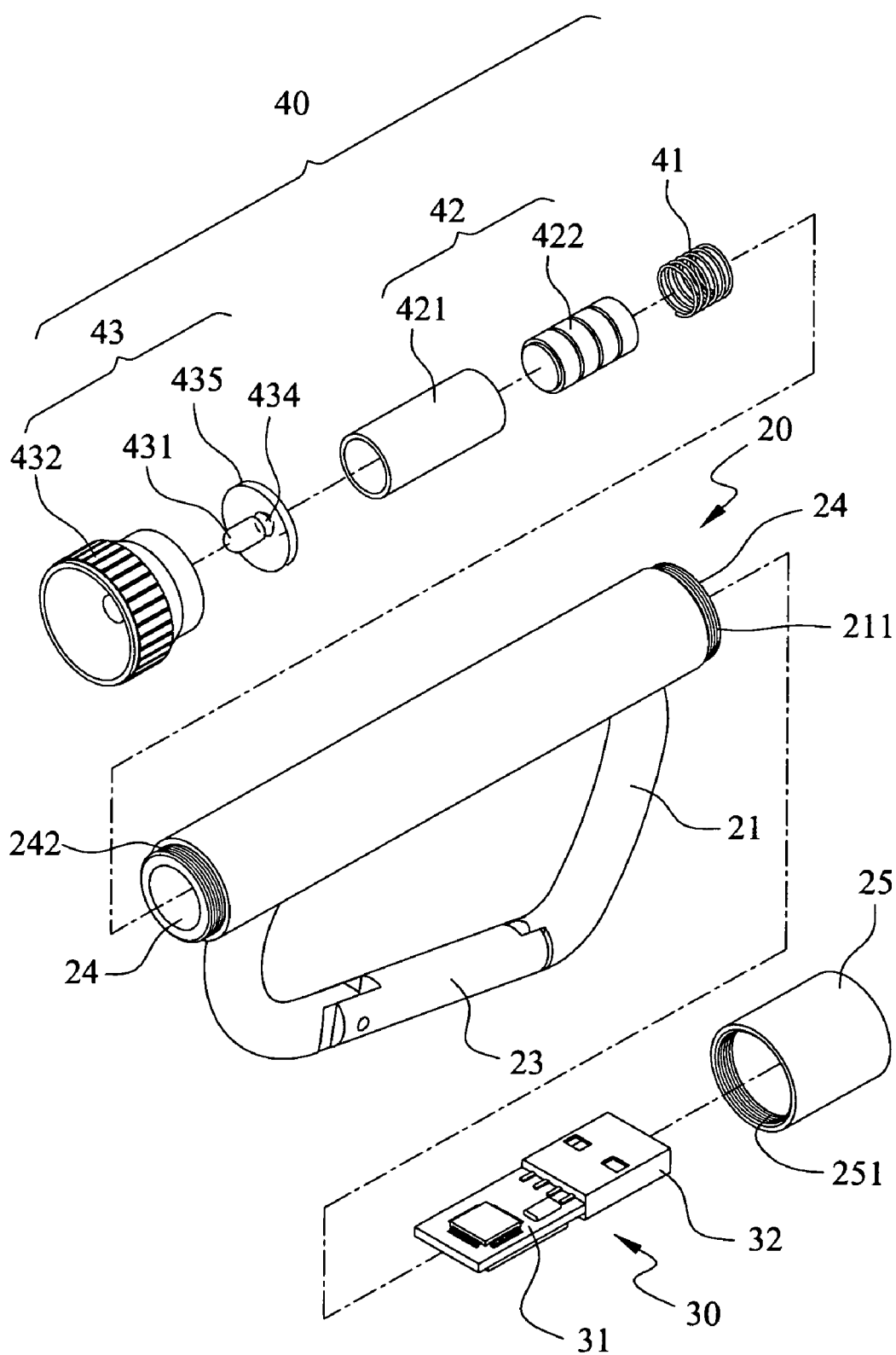
FIG. 3 shows an exploded view of a shackle of the present invention.

Referring to FIG. 2 and FIG. 3, a shackle of the present invention is provided with a shackle body 20 (in this embodiment, the shackle body 20 is made by a good conductor, such as a metallic product like aluminum, iron, or copper) which is provided with an elliptic tube 21. An opening is formed in an interior of the tube 21, and an end of the opening of the tube 21 is pivoted with a locking member 23 that can be pivotally locked on the other end of the tube 21 to close that opening.

Two end surfaces of the tube 21 of the shackle body 20 are concaved respectively with a holding space 24 for emplacing a USB (Universal Serial Bus) flash disk 30 and an LED (Light Emitting Diode) illuminating assembly 40, wherein an end of the USB flash disk 30 is a circuit board 31, and the other end is a USB connector 32 which is electrically connected with the circuit board 31, such that when the USB flash disk 30 is installed in one holding space 24 of the tube 21, the circuit board 31 can be emplaced in the holding space 24, and the USB connector 32 can be protruded out of the tube 21 for connecting to an external computer 50 to download stored data.

The LED illuminating assembly 40 is provided with a spring 41, a battery assembly 42, and a circuit board lamp holder 43, wherein the spring 41 is assembled at the lowest part of the other holding space 24 of the tube 21, with an end of the spring 41 being abutted at a bottom surface 241 of that holding space 24; and the battery assembly 42 includes an insulation sleeve 421 and at least one battery 422 (there are four batteries in the present embodiment) which is emplaced in the insulation sleeve 421 serially. The battery assembly 42 is transfixed in the holding space 24, above the spring 41, enabling a cathode of the battery assembly 42 to be electrically connected with the tube 21 through the spring 41. The circuit board lamp holder 43 is provided with an LED 431, with two pins (anode and cathode) of the LED 431 being electrically connected with a first conduction part 434 and a second conduction part 435 of the circuit board lamp holder 43. In addition, the circuit board lamp holder 43 is sheathed with a hollow outer shell 432, and an inner wall of which, close to an end of the tube 21, is provided with a female thread 433; whereas, an outer rim of an opening of the tube 21 at the other holding space 24 is provided with a male thread 242 which is fitted with the female thread 433, such that the outer shell 432 can be connected at the opening of the other holding space 24, and the circuit board lamp holder 43 can be assembled above the battery assembly 42, by screwing the female thread 433 on the male thread 242, which further enables the first conduction part 434, the battery assembly 42, and the spring 41 to be pressed and joined together, thereby allowing the first conduction part 434 to be electrically connected with an anode of the battery assembly 42.

Figure 4:
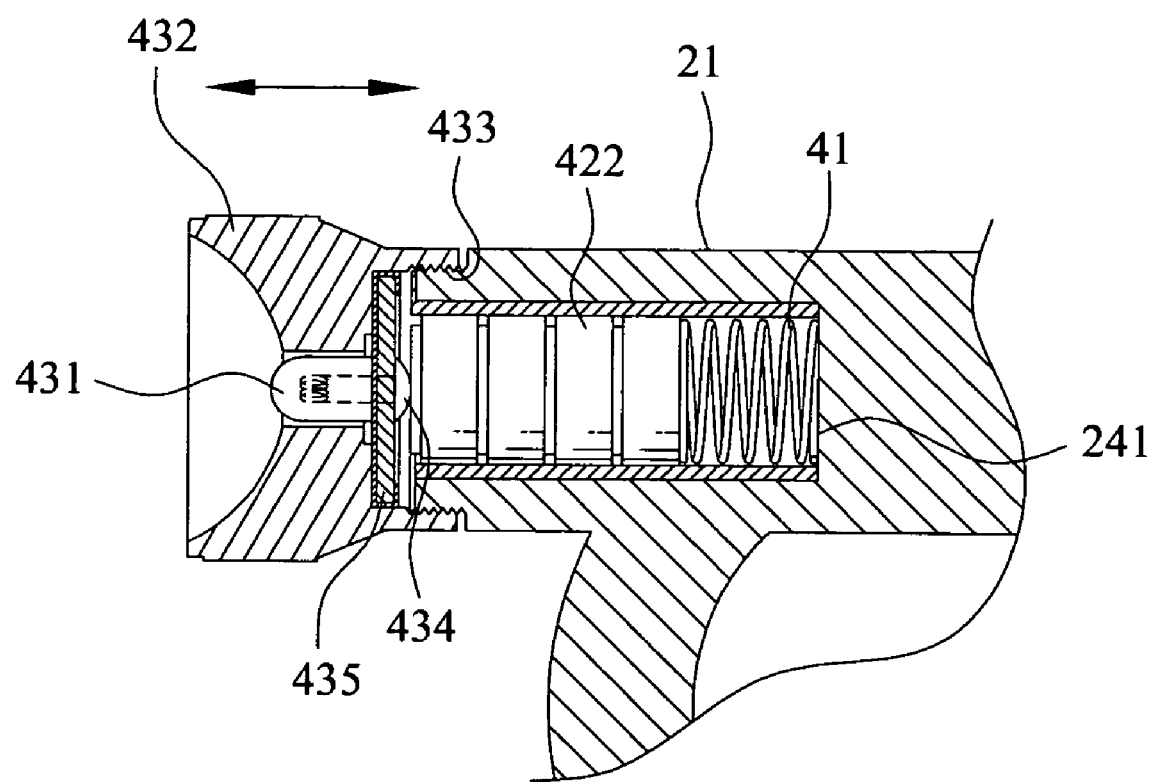
FIG. 4 shows a schematic view of a state of using a shackle of the present invention.
Figure 5:
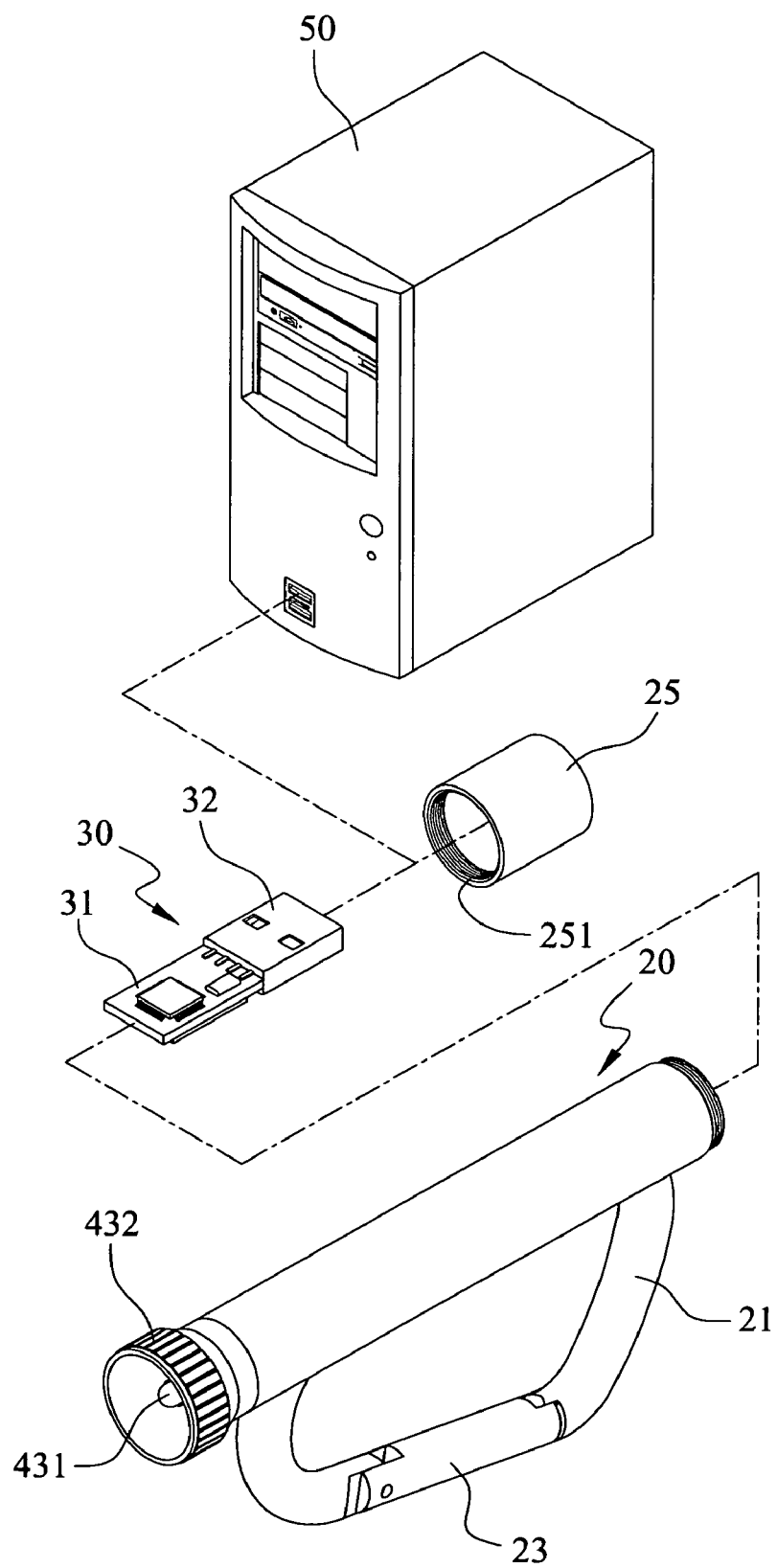
FIG. 5 shows a second schematic view of a state of using a shackle of the present invention.

Referring to FIG. 4, when the circuit board lamp holder 43 is displaced downward at the opening of the tube 21, the second conduction part 435 of the circuit board lamp holder 43 can be in contact with the opening of the tube 21 (that is, by electrically connecting the tube 21 and the spring 41 with the cathode of the battery assembly 42), enabling the LED 431 to be mutually conducted with the anode and the cathode of the battery assembly 42 to energize and illuminate. Accordingly, the shackle of present invention can be provided with both a function of storing digital data and a function of illuminating, through a combination of the USB flash disk 30 and the LED illuminating assembly 40.

Referring to FIGS. 2 to 5, in an embodiment of the present invention, the USB connector 32 is sheathed with a protective outer cap 25 which can be assembled with and separated from the tube 21, in order to cover and hide this USB connector 32.

In the aforementioned embodiment, an inner wall at a connection place of the outer cap 25 is provided with a female thread 251, and an outer rim of an opening of the tube 21, corresponding to this female thread 251, is provided with a male thread 211 which is fitted with the female thread 251, such that the outer cap 25 can be screwed on the opening to cover and hide the USB connector 32, by screwing the female thread 251 with the male thread 211. In addition, referring to FIG. 5, the USB flash disk 30 can be also removed from the tube 21 to be directly connected with the computer 50 for downloading the stored data.

Figure 6:
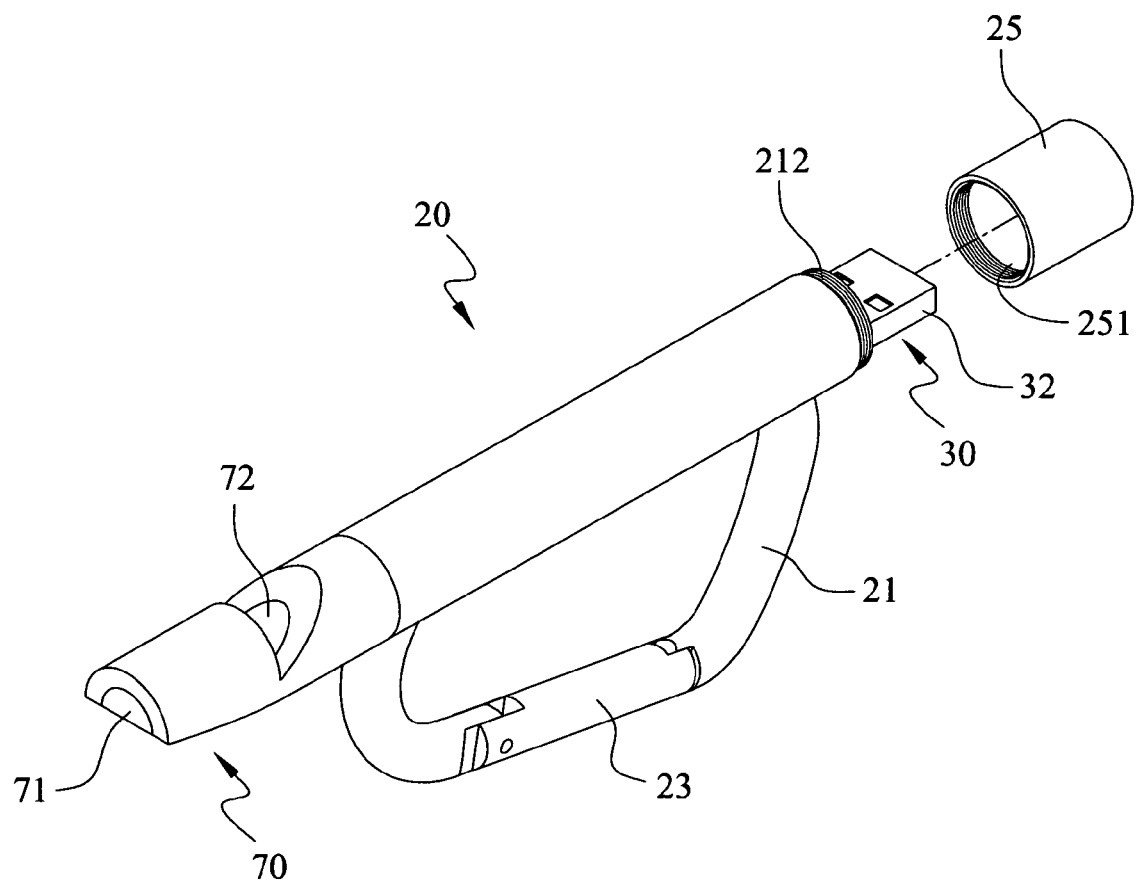
FIG. 6 shows a perspective view of another embodiment of a shackle of the present invention.

Referring to FIG. 6, in another embodiment of the present invention, an end surface of a tube 21 of a shackle body 20 is concaved with a holding space for emplacing a USB flash disk 30, and the other end surface is provided with a whistle 70, wherein an end of the USB flash disk 30 is a circuit board 31, and the other end is a USB connector 32 which is electrically connected with the circuit board 31, such that when the USB flash disk 30 is installed in the holding space of the tube 21, the circuit board 31 is emplaced in the holding space, and the USB connector 32 is protruded out of the tube 21 for connecting with an external computer 50 to download stored data.

On the other hand, an end of the whistle 70 is connected with the tube 21, and the other end is provided with an air inlet 71. The whistle 70 is also provided with a whistle-sound opening 72, such that when air is blown into the air inlet 71, air flow can create the whistle sound at the whistle-sound opening 72. Accordingly, through a combination of the USB flash disk 30 and the whistle 70, the shackle can be provided with both a function of storing digital data and a function of whistling for help.

In this embodiment, as shown in FIG. 6, the USB connector 32 is sheathed with a protective outer cap 25 which can be assembled with and separated from the tube 21, to cover and hide this USB connector 32.

In the aforementioned embodiment, an inner wall at a connection place of the outer cap 25 is provided with a female thread 251, and an outer rim of an opening of the tube 21, corresponding to this female thread 251, is provided with a male thread 212 which is fitted with the female thread 251, such that the outer cap 25 can be screwed on the opening to cover and hide the USB connector 32, by screwing the female thread 251 with the male thread 212.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A multi-functional shackle structure comprising a shackle body which is provided with a tube, with two end surfaces of the tube being concaved respectively with a holding space for emplacing a USB (Universal Serial Bus) flash disk and an LED (Light Emitting Diode) illuminating assembly; the USB flash disk, which is assembled in one holding space of the tube, with one end of which being a circuit board, and the other end being a USB connector which is electrically connected with the circuit board, such that when the USB disk is installed in that holding space, the circuit board is emplaced in the holding space, and the USB connector is protruded out of the tube for connecting with an external computer to download stored data; and the LED illuminating assembly which is provided with a spring, a battery assembly, and a circuit board lamp holder; the spring being assembled at the lowest part of the other holding space of the tube, with one end of the spring being abutted at a bottom surface of that holding space; the battery assembly including an insulation sleeve and at least one battery which is emplaced in the insulation sleeve serially, and the battery assembly being transfixed in that holding space, above the spring, such that a cathode of the battery assembly is electrically connected with the tube through the spring; the circuit board lamp holder being provided with an LED, with two pins (anode and cathode) of the LED being electrically connected with a first conduction part and a second conduction part of the circuit board lamp holder; the circuit board lamp holder also being sheathed with a cone-shape hollow outer shell, with an inner wall of the outer shell, close to an end of the tube, being provided with a female thread, while an outer rim of an opening of the tube at the other holding space, being provided with a male thread which is fitted with the female thread, such that the outer shell is connected on the opening of the other holding space, and the circuit board lamp holder is assembled above the battery assembly, by screwing the female thread on the male thread, which further enables the first conduction part, the battery assembly, and the spring to be pressed and joined together, thereby allowing the first conduction part to be electrically connected with an anode of the battery assembly; when the circuit board lamp holder being displaced downward at the opening of the tube, the second conduction part of the circuit board lamp holder being in contact with the opening of the tube, enabling the LED to be mutually conducted with the anode and the cathode of the battery assembly to energize and illuminate.

2. The multi-functional shackle structure according to claim 1, wherein the USB connector is sheathed with a protective outer cap which is assembled with and separated from the tube to cover and hide this USB connector.

3. The multi-functional shackle structure according to claim 2, wherein an inner wall at a connection place of the outer cap is provided with a female thread, and an outer rim of an opening of the tube, corresponding to this female thread, is provided with a male thread which is fitted with the female thread, such that the outer cap is screwed on the opening to cover and hide the USB connector, by screwing the female thread with the male thread.

4. A multi-functional shackle structure comprising a shackle body, which is provided with a tube, with an end surface of the tube being concaved with a holding space for emplacing a USB flash disk; the USB flash disk, which is installed in the holding space of the tube, an end of which is a circuit board, and the other end of which is a USB connector being electrically connected with the circuit board, such that when the USB flash disk is installed in the holding space of the tube, the circuit board is emplaced in the holding space, and the USB connector is protruded out of the tube for connecting with an external computer to download stored data; and a whistle, which is located at the other end surface of the tube, an end of which is connected with the tube, and the other end of which is provided with an air inlet; the whistle also being provided with a whistle-sound opening, such that when air is blown into the air inlet, the whistle sound is created at the whistle-sound opening by air flow.

5. The multi-functional shackle structure according to claim 4, wherein the USB connector is sheathed with a protective outer cap which is assembled with and separated from the tube, to cover and hide this USB connector.

6. The multi-functional shackle structure according to claim 5, wherein an inner wall at a connection place of the outer cap is provided with a female thread, and an outer rim of an opening of the tube, corresponding to this female thread, is provided with a male thread which is fitted with the female thread, such that the outer cap is screwed on the opening to cover and hide the USB connector, by screwing the female thread with the male thread.

* * * * *